United States Patent [19]

Ogasawara

[11] 4,447,719
[45] May 8, 1984

[54] AUTOMATIC FOCUS ADJUSTING APPARATUS USING WEIGHTED AVERAGE MEANS

[75] Inventor: Akira Ogasawara, Yokohama, Japan
[73] Assignee: Nippon Kogaku K. K., Tokyo, Japan
[21] Appl. No.: 342,776
[22] Filed: Jan. 26, 1982
[30] Foreign Application Priority Data Feb. 3, 1981 [JP] Japan ................................. 56-13748

[51] Int. Cl.³ ............................................. G03B 3/10
[52] U.S. Cl. .................................... 250/204; 354/409
[58] Field of Search .................. 250/201, 204; 354/25; 356/4, 122, 123, 125

[56] References Cited

U.S. PATENT DOCUMENTS

| 4,264,810 | 4/1981 | Utagawa et al. ................... 250/204 |
| 4,284,335 | 8/1981 | Takemae et al. ................ 250/201 X |
| 4,326,127 | 4/1982 | Aoki et al. ....................... 250/201 X |
| 4,367,534 | 1/1983 | Herbst et al. ................... 250/201 X |
| 4,368,383 | 1/1983 | Shirasu et al. ...................... 250/201 |

*Primary Examiner*—William L. Sikes
*Assistant Examiner*—Darwin R. Hostetter
*Attorney, Agent, or Firm*—Shapiro and Shapiro

[57] ABSTRACT

An automatic focus adjusting apparatus is provided with a light sensor producing a photoelectric output corresponding to the optical image of an imaged object, an operation device generating control information indicative of the in-focus position of a phototaking lens with respect to the object in response to the photoelectric output, a servo circuit for driving the phototaking lens in response to the control information, and filter means for transmitting the control information of the operation device to the servo circuit and controlling the responsiveness of the servo circuit to the control information.

11 Claims, 6 Drawing Figures

AUTOMATIC FOCUS ADJUSTING APPARATUS USING WEIGHTED AVERAGE MEANS

BACKGROUND OF THE INVENTION

1. Field of the Invention

This invention relates to an automatic focus adjusting apparatus.

2. Description of the Prior Art

An automatic focus detecting apparatus is disclosed, for example, in U.S. Pat. No. 4,264,810. In this apparatus, control information indicative of the target of a servo system has been generated from the optical image of an object formed on a light receiving element. In such an apparatus, however, improper control information may transiently be applied to the servo system due to hand vibration of the camera or movement of the object. This is particularly likely where the focal length is long and a body lying at a shorter distance than the object enters into the field of view of the detecting optical system due to hand vibration, for example. Therefore, movement of the phototaking lens to its in-focus position by servo control is erratic, and this has impaired the servo system and made photography more difficult.

Further, in the past, a data obtained by only one distance measurement has fluctuated due to the irregularity of a light receiving element array, an operation circuit or the like, and this has reduced the accuracy of distance measurement.

SUMMARY OF THE INVENTION

It is an object of the present invention to provide an automatic focus adjustment apparatus in which the servo system operates smoothly even when subjected to noise, hand vibration or movement of the object.

It is another object of the present invention to provide an automatic focus adjusting apparatus in which the accuracy of distance measurement is enhanced by producing an averaged value of a plurality of data obtained by a plurality of distance measurements.

To achieved these objects, the automatic focus adjusting apparatus of the present invention is provided with a light sensor producing a photoelectric output corresponding to the optical image of an imaged object, an operation device generating control information indicative of the in-focus position of the phototaking lens with respect to the object in response to the photoelectric output, a servo circuit for driving the phototaking lens in response to the control information, and filter means for transmitting the control information of the operation device to the servo circuit and controlling the responsiveness of the servo circuit to the control information.

The invention will become more fully apparent from the following detailed description thereof taken in conjunction with the accompanying drawings.

DESCRIPTION OF THE PREFERRED EMBODIMENTS

Figure 1:
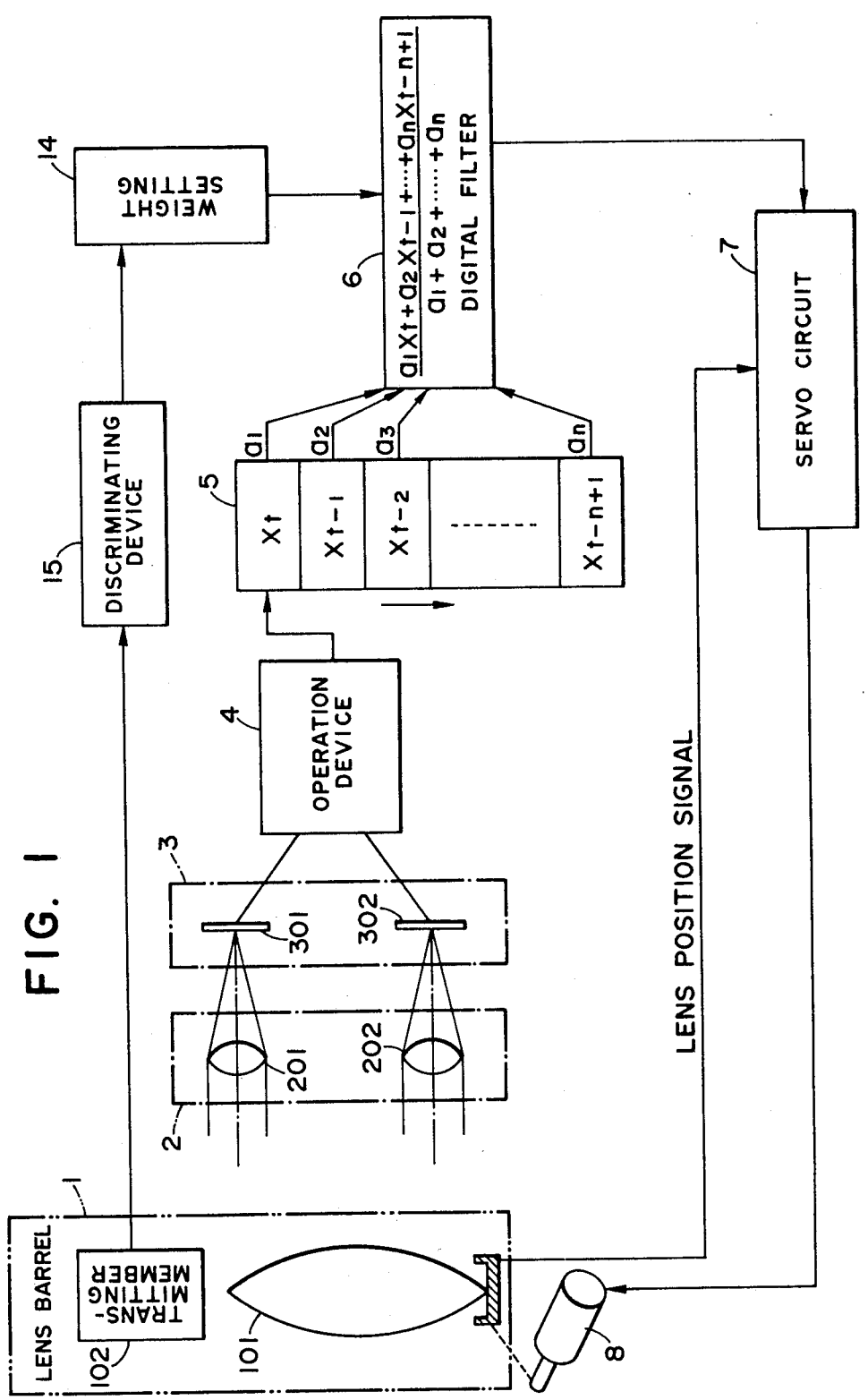
FIG. 1 is a schematic diagram showing a first embodiment of the present invention which is applied to a camera.

FIG. 1 shows a first embodiment in which the automatic focus adjusting apparatus according to the present invention is applied to a camera. This automatic focus adjusting apparatus comprises a light sensor 3 including light receiving element arrays 301 and 302 onto which light from an object passed through a focusing lens 101 in an interchangeable phototaking lens barrel 1 is projected through a pair of imaging lenses 201 and 202, an operation device 4, a shift register stack 5, a digital filter 6, a servo circuit 7, a servomotor 8, a transmitting member 102 for transmitting information as to the focal length of the focusing lens 101, a weight setting 14 for setting the weight of the digital filter 6, and a discriminating device 15 for discriminating the focal length of the focusing lens 101.

The light from the object passes through the lens 101 and is imaged by the imaging lenses 201 and 202 on the light receiving element arrays 301 and 302 comprising charge accumulation type light receiving elements such as CCD, and the light receiving element arrays 301 and 302 produce outputs corresponding to the conditions of the optical images. The outputs of the light receiving element arrays 301 and 302 are time-serially introduced into the operation device 4 by scanning. The light receiving element arrays 301 and 302 may be designed such that their outputs have the scanning periods thereof changed by an AGC (automatic gain controller) in accordance with the object brightness. The operation device 4 applies control information indicating the in-focus position from the outputs of the light receiving element arrays 301 and 302 to the shift register stack 5. This control information is time-serially produced in accordance with the operation period of the operation device 4. Accordingly, if the outputs of the light receiving element arrays 301 and 302 are controlled by the AGC, the operation period varies in accordance with the object brightness.

The control information generated by the operation device 4 is successively accumulated in the shift register stack 5. In the shift register stack 5, n control signals $(X_t - X_{t-n+1})$ are always accumulated as data. The control signals become new in the order of $X_{t-n+1}, X_{t-n+2}, \ldots, X_t$. Each of these n data is averaged with a weight appropriately applied thereto by the digital filter 6. By this averaging, the responsiveness of the servo system to the control information for a fluctuation of the control information is reduced, that is, a filter effect is imparted. The averaged output $Y_t$ by the weighted mean for any time point t is represented by a simple equation like $$Y_t = \frac{a_1 X_t + a_2 X_{t-1} \cdots + a_n X_{t-n+1}}{a_1 + a_2 + \ldots + a_n} \tag{1}$$

The values of the weights $a_1, a_2, \ldots a_n$ are set by the weight setting 14 in accordance with the focal length information of the phototaking lens produced by the discriminating device 15. The weights a1, a2, ... an one-to-one correspond to $X_t, X_{t-1}, \ldots, X_{t-n+1}$. As a matter of course, it is also possible to decrease the number of terms of the control signal by making the values of the weights zero. In this manner, the control information emitted by the operation device 4 is adjusted by the filter effect, and the adjusted control signal is applied to the servo circuit 7. Accordingly, the servo circuit 7 drives the motor 8 with smooth responsiveness in accordance with the control information of the digital filter 6. The detection of the in-focus position by the operation circuit 4, the shift register 5 and the digital filter 6 and the driving of the servo circuit 7 and the motor 8 take place independently of each other. Thus, servo is effected while carrying out the detection of the in-focus position by reducing the responsiveness of the motor 8 to the in-focus position information from the operation circuit 4 by the weight setting 14. Alternatively, when consideration is given to only the purpose of increasing the accuracy of the in-focus position detection instead of the purpose of reducing the responsiveness, the values of the weights a1, a2, ..., an may be made coincident with one another by the weight setting 14. By this, the digital filter 6 produces the mean value of the n data $X_1, X_2, \ldots, X_n$ to the servo circuit 7. The servo circuit 7 drives the motor 8 to move the focusing lens 101 to its in-focus position.

Figure 2:
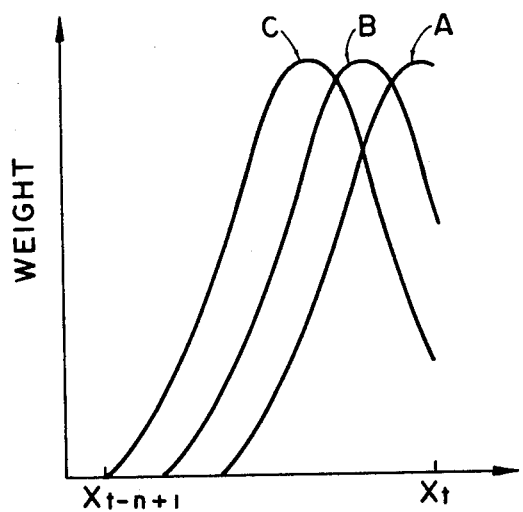
FIG. 2 is a graph illustrating a specific example of the setting of the weight of a weighted mean.

The characteristics of the filter effect by the digital filter 6 are shown by A, B and C in FIG. 2. The horizontal axis represents the control signal outputs $X_{t-n+1}, X_{t-n+2}, \ldots, X_t$ and the vertical axis represents the values of the weights a1, a2, ... an exerted on each of the outputs $X_{t-n+1}, X_{t-n+2}, \ldots, X_t$. The characteristic A of the weight of FIG. 2 is high in responsiveness, the characteristic C of the weight is low in responsiveness, and the characteristic B of the weight is medium in responsiveness. Accordingly, as the focal length of the phototaking lens mounted to a camera becomes longer, the characteristics of the filter corresponds to A, B and C in the named order.

Figure 3:
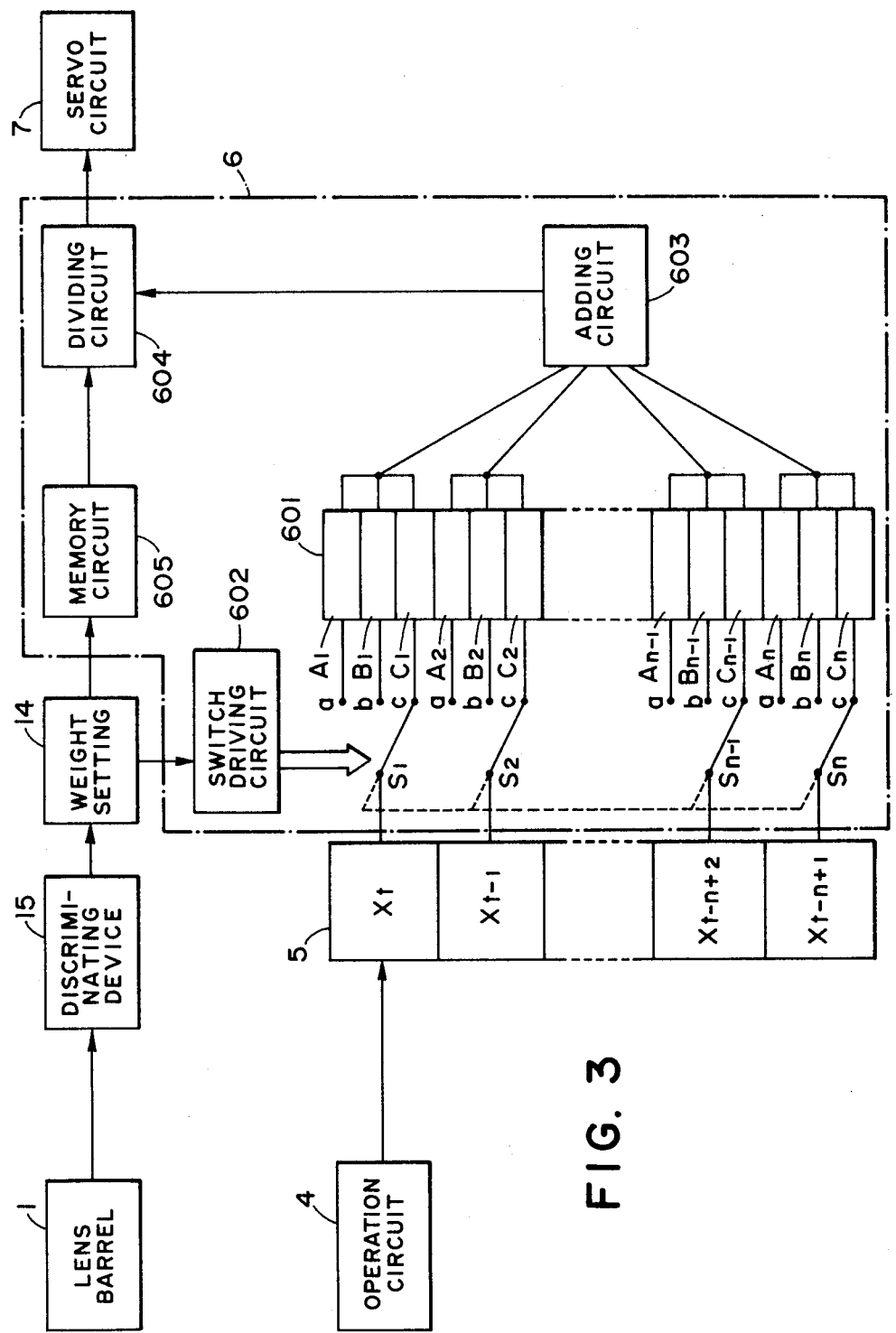
FIG. 3 is a block diagram showing the circuit construction of a digital filter.

FIG. 3 shows the specific construction of the digital filter 6. The digital filter 6 comprises a weighting circuit 601 consisting of n sets of blocks for imparting the aforementioned characteristics A, B and C to each control signal, each set comprising three filter elements, switches $S_1, S_2, \ldots, S_n$ for selectively connecting the control signal outputs to any of the filter elements of the corresponding sets, a switch driving circuit 602, an adding circuit 603, a dividing circuit 604 and a memory circuit 605.

The weight representing the characteristic A comprises elements $A_1, A_2, \ldots, A_n$, the weight representing the characteristic B comprises elements $B_1, B_2, \ldots, B_n$, and the weight representing the characteristic C comprises elements $C_1, C_2, \ldots, C_n$. The weight setting 14 generates a signal to the switch driving circuit 602 and the memory circuit 605.

The focal length information of the phototaking lens barrel 1 is input to a discriminating device 15, which discriminates it and produce a signal to the weight setting 14. When the focal length is long, the servo circuit 7 becomes more stable and better operation is obtained if a stronger filter effect is provided and therefore, from information designating a long local length, the discriminating device 15 judges the characteristic of the filter as C which is low in responsiveness, and produces a discrimination signal of the filter to the switch driving circuit 602 and the memory circuit 605 through the weight setting 14. Switches $S_1, S_2, \ldots, S_n$ are each connected to terminal C by the switch driving circuit 602, and data $X_t, X_{t-1}, \ldots, X_{t-n+1}$ are input to elements $C_1, C_2, \ldots, C_n$, respectively. The sum of the weights in each characteristic of the filter is prestored in the memory circuit 605, which, by the signal from the weight setting 14, produces the sum of the weights corresponding thereto as a signal to the dividing circuit 604. In this case, it generates the sum of the weights of the filter having the characteristic C. Here, the data $X_t, X_{t-1}, \ldots, X_{t-n+1}$ of the control signals accumulated in the shift register 5 by being input thereto from the operation circuit 4 are input to filters $C_1, C_2, \ldots, C_n$ through the switches $S_1, S_2, \ldots, S_n$. Each of the data $X_t, X_{t-1}, \ldots, X_{t-n+1}$ is weighted by the weighting circuit 601 and supplied to the adding circuit 603. The adding circuit 603 adds the output of the weighting circuit 601 and generates it to the dividing circuit 604. The dividing circuit 604 divides the output of the adding circuit 603 by the sum of the weights in accordance with the aforementioned equation (1), and produces the result to the servo circuit 7.

What has been described above can be realized, for example, by providing the elements $A_1, A_2, \ldots, A_n$, $B_1, B_2, \ldots, B_n$ and $C_1, C_2, \ldots, C_n$ of the weighting circuit 601 with resistors corresponding to the respective weights, causing an output current to flow from the shift register 5, and causing the resultant voltages to be produced to the adding circuit 603. Also, the design is such that if the focal length information from the phototaking lens barrel 1 is analog, the discriminating device 15 A/D-converts it and produces a digital signal to the weight setting 14.

Generally, the responsiveness and stability of the servo system are not compatible. In the foregoing, the types of the filter have been limited and the filter characteristic has been changed by change-over of a mechanical switch, whereas the entire averaging circuit 6 may also be replaced with a microprocessor so that control may be effected in accordance with a program. By this, it is possible to adjust constants a1—an and/or the number of terms n discretely in a case where good responsiveness is required and in a case where stability is required and to provide filter characteristics suitable for the respective cases.

Figure 4:
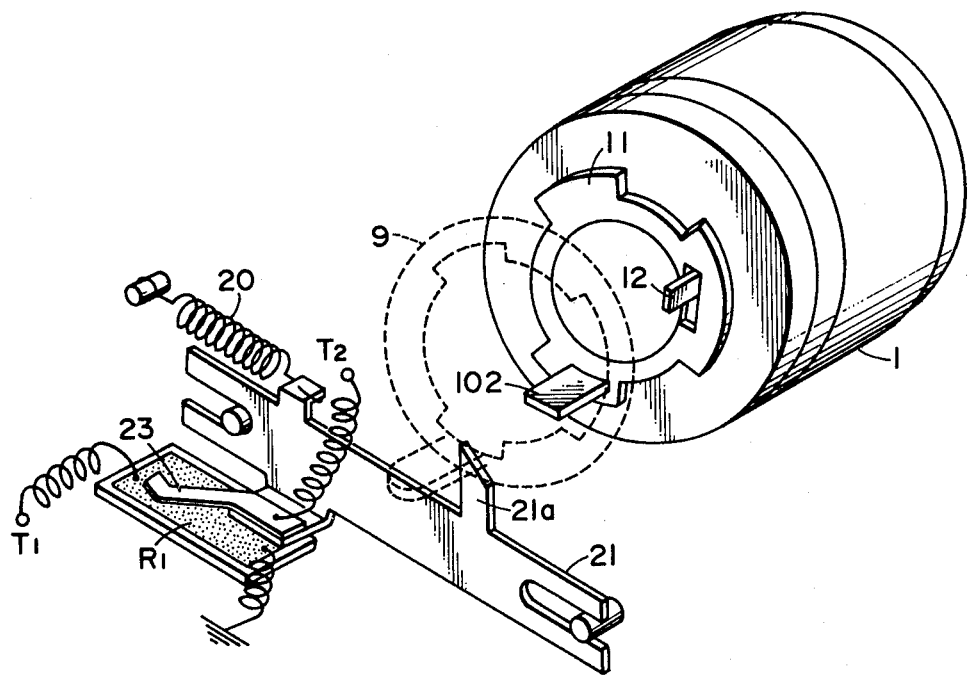
FIG. 4 is a perspective view showing an embodiment of a device for introducing focal length information of the phototaking lens into the camera body.

FIG. 4 shows an embodiment of a device for introducing the focal length information of the phototaking lens into the camera. The interchangeable phototaking lens 1 has a lens mount 11 coupled to a body side mount 9 provided in the camera body, an automatic diaphragm lever 12 located intermediate of a diaphragm blade and a camera side automatic stop-down mechanism and operatively associated with this mechanism to stop down the diaphragm, and a transmitting member 102. This transmitting member 102 may differ in its location depending on the type of the interchangeable lens.

The aforementioned discriminating device 15 is provided on the camera body side. The discriminating device 15 comprises a resistance plate formed with resistor $R_1$, a brush 23 slidable on the resistor, terminal $T_1, T_2$, a slide lever 21 biased in one direction by a spring 20, and a reception member 21a projectingly provided on the slide lever 21 in opposed relationship with the lens mounting opening of the body side mount 9. Accordingly, the resistor $R_1$ and the brush 23 together constitute a variable resistor, and a required resistance value is obtained between the terminals $T_1$ and $T_2$.

Now, when the lens 1 is to be mounted to the camera body, the bayonet mount 11 is inserted into the mount of the camera and rotated counterclockwise. At this time, the transmitting member 102 engages the reception member 21a projectingly provided on the slide lever 21. When the lens is rotated counterclockwise, the slide lever 21 slides rightwardly as viewed in FIG. 4 and, in response thereto, the brush 23 slides on the resistor $R_1$. When the rotation of the lens is stopped with the mounting operation being completed, the slide lever 21 stops sliding and the resistance value between the terminals $T_1$ and $T_2$ is fixed.

In lenses having different focal lengths, the transmitting member 102 differs in its location as a matter of course, and the resistance value between the terminals $T_1$ and $T_2$ is varied in response to the mounting operation with respect to the camera. By the output of this resistor, the discriminating device 15 discriminates the focal length of the lends and generates the result of the discrimination to the weight setting 14. If the output of the resistor between the terminals $T_1$ and $T_2$ is A/D-converted, there is obtained a digital output.

Figure 5:
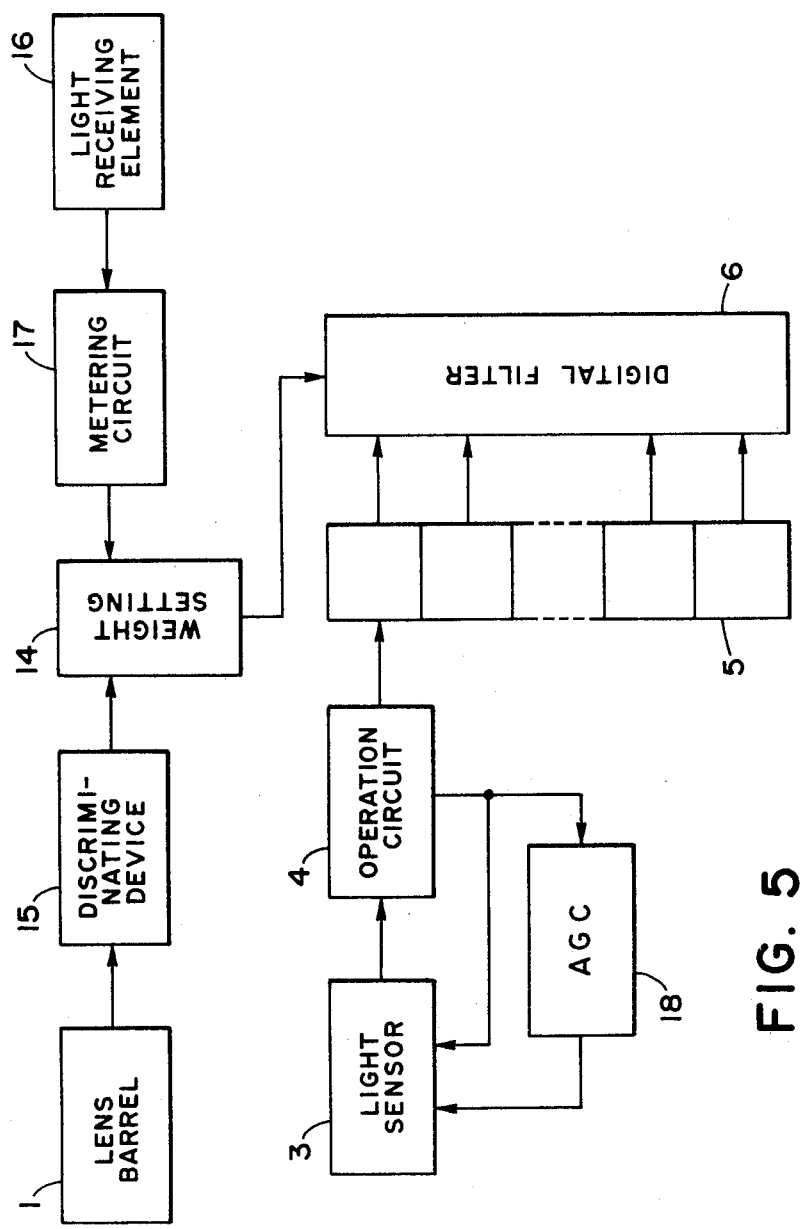
FIG. 5 is a block diagram showing the construction of a second embodiment of the present invention.

FIG. 5 shows a second embodiment of the present invention in which the setting of the weight of the digital filter 6 is effected by information as to the object brightness in addition to the information as to the focal length of the lens. A light sensor 3 comprises a charge accumulation type light receiving element array such as CCD and is connected to AGC 18. An operation circuit 4 is connected so as to produce a signal to the AGC 18 and the light sensor 3. Also, a light receiving element 16 is connected to a metering circuit 17 which in turn is connected to a weight setting 14.

By the AGC 18, the light sensor 3 adjusts the scanning period in accordance with the object brightness and eventually, the responsiveness of a servo circuit 7 varies in accordance with the object brightness. That is, if the object brightness is low, the responsiveness of the servo circuit 7 becomes high and, if the object brightness is high, the responsiveness of the servo circuit 7 becomes low. The metering circuit 17 detects the object brightness through the light receiving element 16 and emits information relating to the object brightness to the weight setting 14. The weight setting 14 sets the weight from the information as to the focal length and the information as to the object brightness. Operation of the light sensor 3, operation circuit 4 and AGC 18 will hereinafter be described by reference to FIG. 6.

Figure 6:
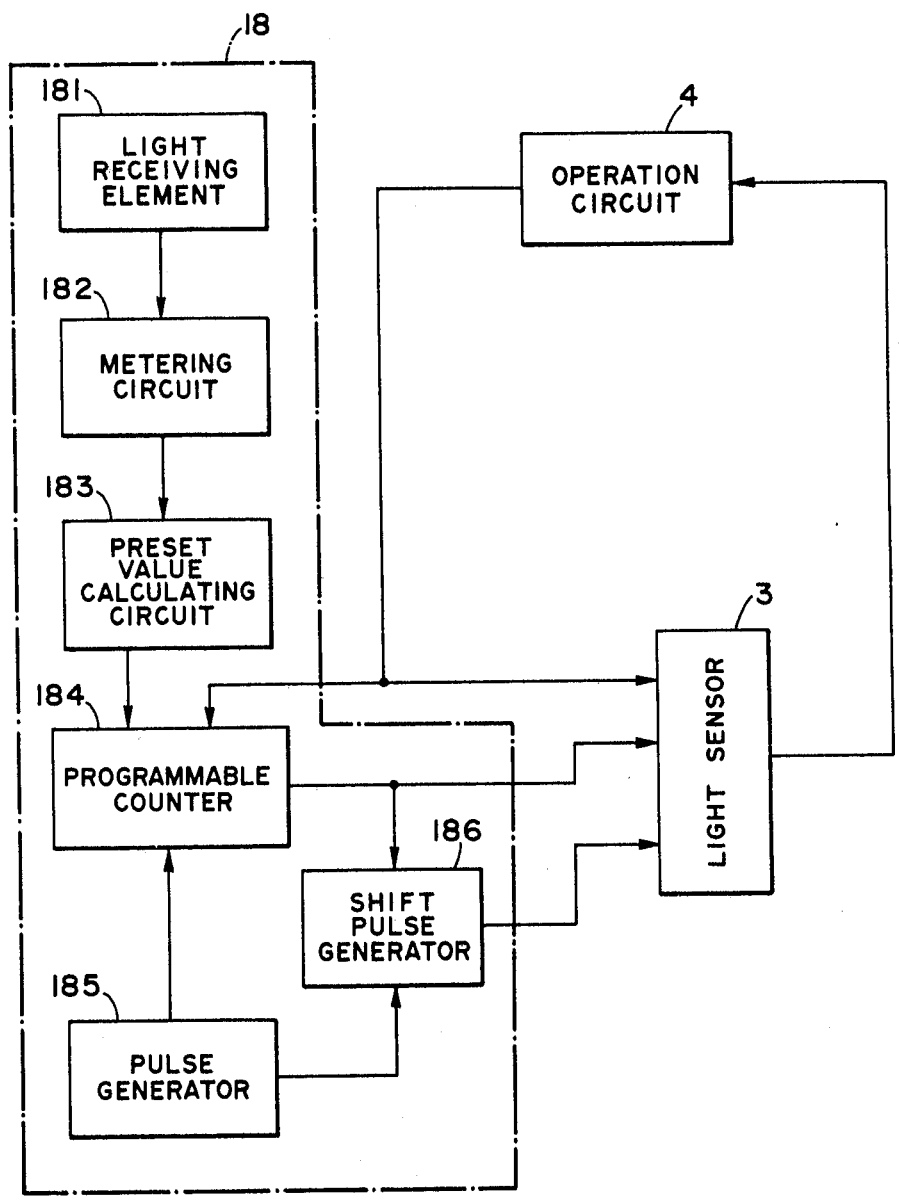
FIG. 6 is a block diagram showing the construction of the AGC of FIG. 5.

In FIG. 6, the AGC 18 comprises a light receiving element 181, a metering circuit 182, a preset value calculating circuit 183, a programmable counter 184, a pulse generator 185 and a shift pulse generator 186.

The metering circuit 182 detects the object brightness through the light receiving element 181 and generates information as to the object brightness to the preset value calculating circuit 183. The preset value calculating circuit 183 produces to the programmable counter 184 a binary code digital signal corresponding to the object brightness, whereby the programmable counter 184 is preset in accordance with the object brightness. The operation circuit 4, upon completion of the operation for detecting the in-focus position, emits a reset pulse to the light sensor 3 and the programmable counter 184. Thereby, the light sensor 3 starts charge accumulation and the programmable counter 184 starts to count the clock pulses from the pulse generator 185. When its count value becomes coincident with the preset value, the programmable counter 184 generates a pulse to the light sensor 3 to open the shift gate in the light sensor 3 and simultaneously therewith, causes the shift pulse generator 186 to generate a pulse for enabling the light sensor 3 to produce the accumulated charge.

I claim:

1. In an automatic focus adjusting apparatus for forming the image of an object by an imaging optical system on a predetermined imaging plane, said apparatus having detecting means for detecting the positional relation between the image of said object and said imaging plane from the output of a light receiving element array and successively producing detection signals indicative of said relation with lapse of time, the improvement comprising: means capable of storing a predetermined number of said detection signals, averaging means for averaging said predetermined number of detection signals and creating an adjusted control signal; and means for driving said imaging optical system for focuing the same in response to said adjusted control signal.

2. In an automatic focus adjusting apparatus for forming the image of an object by an imaging optical system on a predetermined imaging plane, said apparatus having detecting means for detecting the positional relation between the image of said object and said imaging plane from the output of a light receiving element array and successively producing detection signals indicative of said relation with lapse of time, the improvement comprising:
  memory means capable of storing a predetermined number of said detection signals;
  weighted averaging means for weighted-averaging said predetermined number of detection signals and creating an adjusted control signal; and
  means for driving said imageing optical system for focusing the same in response to said adjusted control signal.

3. The improvement recited in claim 2, wherein said memory means includes shift means provided so as to be capable of storing said detection signals in succession, said shift means being adapted for removing, in response to the storage of said detection signals, the oldest detection signal from a plurality of detection signals stored before said storage and for transmitting the predetermined number of stored detection signals to said weighted averaging means.

4. The improvement recited in claim 3, wherein said apparatus includes means for setting the weight for the weighted averaging for individual ones of said stored detection signals.

5. The improvement recited in claim 4, wherein said apparatus further includes means for detecting the focal length of said imaging optical system, and said weight setting means is capable of determining said weight in response to said focal length detecting means.

6. The improvement recited in claim 4, wherein said light receiving element array comprises a charge accumulation type photoelectric conversion element array, said apparatus further includes means for scanning said light receiving element array, means for adjusting the scanning period of said element array in accordance with the intensity of light received by said light receiving element array, means for measuring the intensity of light from said object, and means for introducing information as to said intensity of light into said weight setting means, and wherein said weight setting means is capable of setting said weight in response to said information.

7. In an automatic focus adjusting apparatus for forming the image of an object by an imaging optical system on a predetermined imaging plane, said apparatus having detecting means for detecting the positional relation between the image of said object and said imaging plane from the output of a light receiving element array and successively producing detection signals indicative of said relation with lapse of time, the improvement comprising:

means for producing an adjusted control signal dependent upon an average of a plurality of said successive detection signals; and means for driving said imaging optical system for focusing the same in response to said adjusted control signal.

8. The improvement recited in claim 7, wherein said producing means comprises means for storing said plurality of detection signals in succession and a digital filter having filter elements adapted to receive the stored detection signals as inputs.

9. The improvement recited in claim 8, wherein said digital filter has an adding circuit connected to receive the outputs of said filter elements.

10. The improvement recited in claim 8, wherein said digital filter has switching means for connecting selected filter elements to receive said stored detection signals.

11. The improvement recited in claim 7, wherein said producing means comprises means for weighting the values of said plurality of detection signals to adjust the responsiveness of said driving means to the output of said light receiving element array.

* * * * *